United States Patent [19]

Meyer, Jr.

[11] 4,067,114
[45] Jan. 10, 1978

[54] VARIABLE AMPLIFICATION EXPANDING PLUG GAGE

[76] Inventor: Franklin Meyer, Jr., P.O. Box 1, Forestdale, R.I. 02824

[21] Appl. No.: 721,389

[22] Filed: Sept. 8, 1976

[51] Int. Cl.² ............................................. G01B 5/12
[52] U.S. Cl. ................................. 33/178 R; 33/178 E
[58] Field of Search ............. 33/147 K, 147 F, 178 R, 33/178 E

[56] References Cited

U.S. PATENT DOCUMENTS

| 953,282 | 3/1910 | Nash | 33/178 R |
|---|---|---|---|
| 1,633,807 | 6/1927 | Darlington | 33/178 R |
| 1,806,893 | 5/1931 | Cunningham | 33/178 R |
| 2,741,850 | 4/1956 | Reed | 33/178 R |
| 3,940,856 | 3/1976 | Meyer, Jr. | 33/178 R |

FOREIGN PATENT DOCUMENTS 546,900  8/1942  United Kingdom .............. 33/178 R

*Primary Examiner*—Richard E. Aegerter
*Assistant Examiner*—Richard R. Stearns
*Attorney, Agent, or Firm*—Maurice R. Boiteau

[57] ABSTRACT

There is disclosed in the present application an expanding plug gage assembly adapted to being coupled either to an amplifying and indicating mechanism or to an electronic comparator which has its own size display. The plug is formed with an interior socket entered by a tapered plunger for expanding the plug. The angle of the taper on the plunger is varied to provide different degrees of primary amplification supplemented by the secondary amplification of the mechanism or comparator to which the assembly is coupled. The socket is formed so as to receive various plungers to provide different degrees of amplification from the same plug.

4 Claims, 5 Drawing Figures

VARIABLE AMPLIFICATION EXPANDING PLUG GAGE

The present invention relates generally to improvements in precision gaging apparatus and more particularly to gages of the expanding plug type, adapted to being coupled to amplifying and indicating mechanisms or electronic comparators on which the size of a bore in a workpiece is read exactly.

In some respects, the present invention relates to improvements in gaging assemblies including expanding plugs and amplifying and indicating mechanisms such as those disclosed in U.S. Pat. No. 1,652,854 granted Dec. 15, 1927 upon application of Philip J. Darlington. According to the construction of the Darlington patent, a split plug is formed with internal opposed conical seats to receive the conical end of a plunger which is spring-pressed to cause the expansion of the plug and to translate the expansion of the plug to an amplifying and indicating mechanism which amplifies the longitudinal motion of the plunger as the plug expands and contacts to fit an opening in the workpiece. The mechanism includes a dial indicator having a pointer which indicates on a graduated scale, any departure in the size of the workpiece opening from a pre-determined basic dimension. According to the Darlington patent, the conical seats are formed to fit the conical end of the plunger when the plug is expanded to its largest diameter. The Darlington construction introduces a number of limitations and problems because of the need to couple the plunger to conical seats. The Darlington problems are cured and the performance of the expanding plug is substantially improved by the present invention. In addition, the utility of the basic Darlington system is also greatly extended.

In order better to understand the problems presented by the Darlington construction and the improvements achieved by the present invention, the mode of operation of the Darlington gaging assembly will be reviewed briefly. In its modern or current form, the indicator portion of the assembly based on the Darlington disclosure includes a scale extending plus or minus from a central zero through a total central angle of 288°, 144° each side of zero. Typically, the entire scale may represent a variation of plus or minus 0.006 inch from the basic dimension corresponding to the central zero on the scale. In order for an index pointer to cover the whole scale, the conical ended plunger which is coupled to the amplifying and indicating mechanism must have a total longitudinal travel of 0.084 inch, 0.042 inch each side of the zero on the indicator scale. It is thus seen that the amplifying and indicating mechanism in its current form is adapted to translating a longitudinal plunger motion of 0.084 inch into angular motion of 288° of the index pointer, typically representing a total tolerance band of 0.012 inch, 0.006 each side of the basic dimension.

While it is possible to vary the amplification factor of the Darlington mechanism by changes in the gearing and levers which are component parts of the amplifying mechanism, it is a much more simple solution to vary the total effective amplification of the system including the plug with its fitted plunger and the mechanism by simply changing the included angle of the conical end of the plunger. The effect of changing the included angle is to alter the primary amplification factor of the plug rather than changing the secondary amplification factor of the mechanism. However, because of the relationship of the conical end of the plunger with the conical seats in the Darlington construction, any change in the included angle of the plunger must be accompanied by a corresponding change in the included angle of the conical seat in the plug. The result is that each plug according to the Darlington patent is suitable for a single primary amplification factor and both the plug and the plunger must be replaced to obtain a different amplification from the whole system without internally modifying the amplifying and indicating mechanism.

In addition to the inherent difficulties encountered in changing the amplification factor of plug assemblies in the Darlington construction, there are other problems involved in manufacturing and inaccuracies which limit the suitability of such assemblies for measurements requiring a high order of precision even when the gage is new and which further affect the useful life of the plug assembly. The manufacturing problems are related to the original limitation on the accuracy in the Darlington construction in that the conical seats are extremely difficult if not impossible to machine with the degree of surface finish and accuracy of form necessary to provide the appropriate mating condition with the conical end of the plunger. Because of the shape of the seat, machining it to the optimum degree of surface smoothness is practically impossible either by reaming before heat treatment or by a combination of grinding and lapping after heat treatment. It is also very difficult to check the accuracy of the size and shape of the finished seat. As far as premature wear is concerned, the Darlington construction, in which the taper of the plunger is close to fitting the seat through most of the measuring range of the plug, results in an inaccuracy caused by an enlarged area of contact near the small end of the plunger and seat as the plunger and seat are both subjected to even a small amount of wear in the contact area. Consequently, what starts out as a point contact between the plunger and seat at the low end of the tolerance band becomes a relatively broad area surface contact. As the measured size increases, contact between the plunger and the seat shifts from the broad wear area, through point contact in the intermediate part of the tolerance band, to full engagement as the upper limit is approached. At high amplification, such changes in the mode of contact produce objectionable disproportionality between the expansion of the plug and the reading on the indicator dial.

It is accordingly an object of the present invention to provide an expanding plug gage assembly which may be more economically manufactured and has a longer useful life.

Another object is to provide an expanding plug gage assembly in which a single plug is adapted to have its primary amplification factor changed for measuring the same basic dimension with different tolerance bands.

A further object is to provide an expanding plug gage assembly not only adapted to being coupled to mechanical amplifying and indicating mechanisms of the Darlington type, but also to being employed in conjunction with a variety of comparators in which high secondary amplification is readily provided electronically without requiring mechanically obtained primary amplification.

The foregoing objects are achieved in accordance with the present invention by an expanding plug gage assembly including a split expandable plug adapted to being selectively coupled with one of a plurality of plug-expanding and measurement-translating plungers having different tapers engaging a seat in the plug to provide different primary amplification factors. The seat in the plug according to a feature of the invention is formed in a plane defined by the intersection of a cylindrical bore and a co-axially formed conical surface of much greater included angle than that of the tapered end of the plunger. In the space between the plunger and the conical relief of the seat, there is space to provide a reservoir of a small quantity of oil which lubricates the operation of the gage and extends its life by preventing wear in the area of contact between the plunger and the seat in the plug.

The foregoing objects and features of the present invention will be more fully understood from the following detailed description of an illustrative embodiment taken in connection with the accompanying drawings in which.

Figure 2:
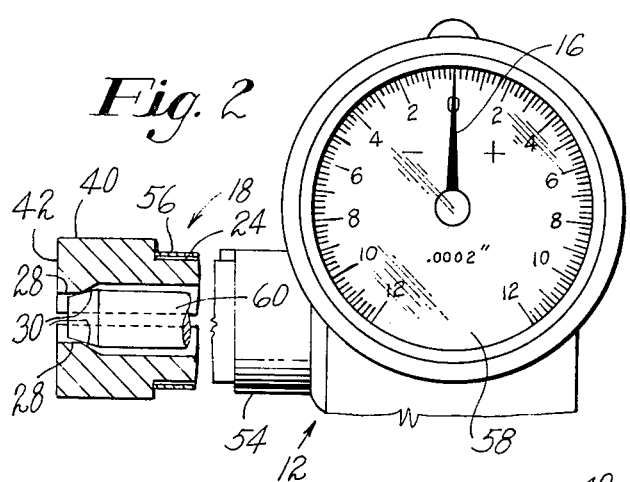
FIG. 2 is a view similar to FIG. 1 but of an expanding plug gage assembly adapted to a primary amplification factor of low range, coupled to a fragmentarily depicted amplifying and indicating mechanism fitted with an appropriate indicator face.
Figure 3:
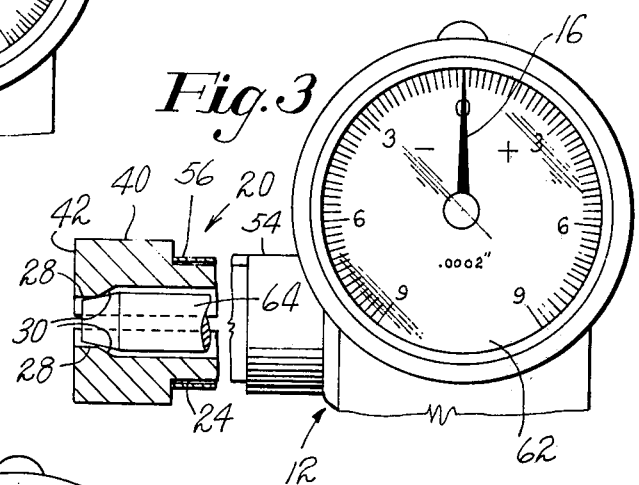
FIG. 3 is a view similar to FIG. 2 but of an assembly adapted to a primary amplification factor in a range between that of FIGS. 1 and 2 and also fitted with an appropriate indicator face.
Figure 4:
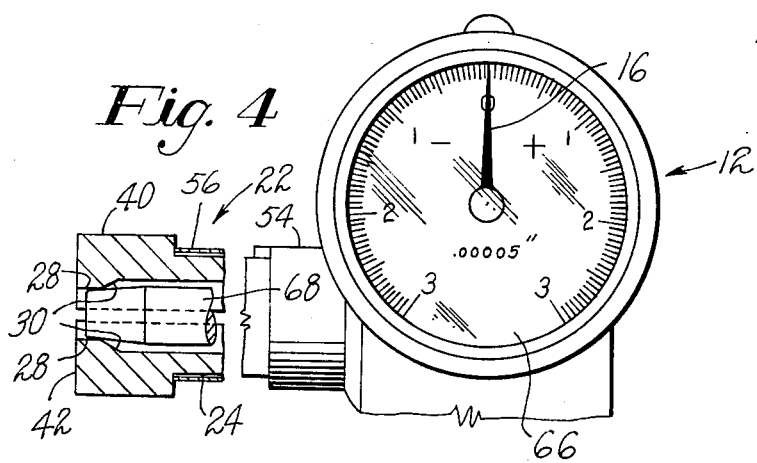
Figure 5:
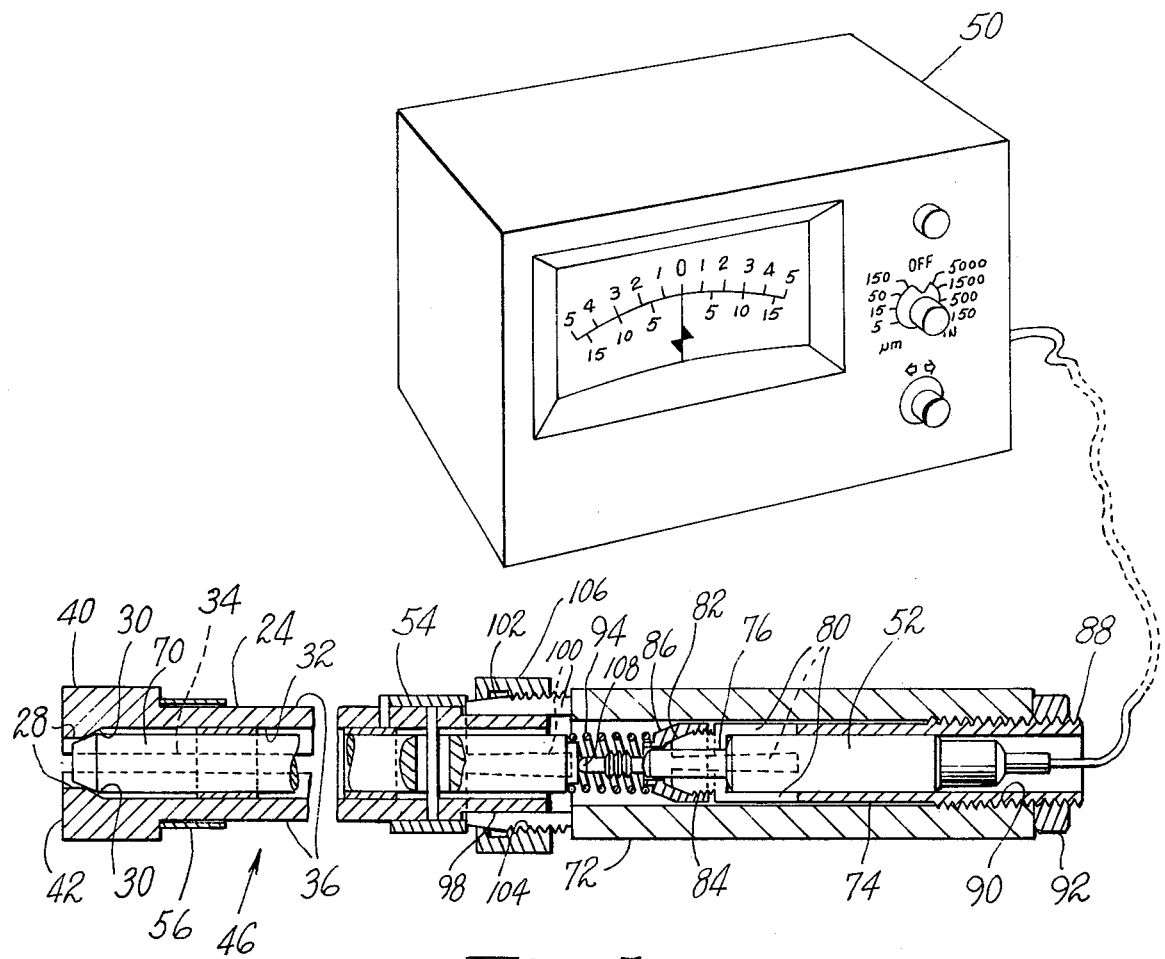

FIG. 4 is a view similar to FIGS. 2 and 3 but showing a plug gage assembly adapted to a primary amplification factor in a high range and appropriately fitted with a dial indicator face; and FIG. 5 is a view in side elevation of an expanding plug gage assembly adapted to a zero primary amplification factor and coupled to an electronic comparator by means of an electrical pickup connected to an amplifier which provides the necessary secondary amplification.

Figure 1:
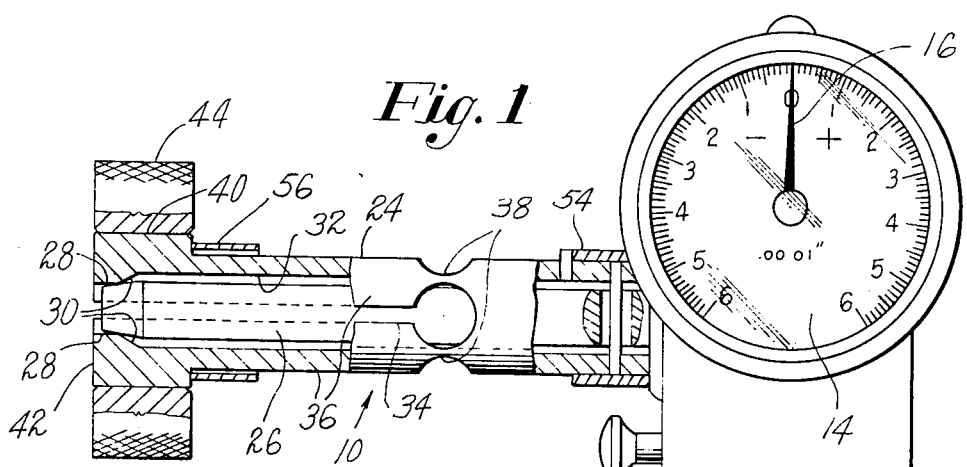
FIG. 1 is a view in side elevation and partly in cross-section of an expanding plug gage assembly adapted to a primary amplification factor of intermediate range, shown coupled to an amplifying and indicating mechanism fitted with an appropriate indicator face.

Turning now to the drawings, particularly FIG. 1, there is shown an expanding plug gage assembly indicated generally at 10, coupled to an amplifying and indicating mechanism indicated generally at 12 and fitted with a dial 14 on which the departure from basic size of a bore being measured is indicated by an index pointer 16. In the description of FIGS. 2 to 4 inclusive, it will be noted from the beginning that each depicts an amplifying and indicating mechanism 12 exactly like that of FIG. 1 except for the fact that a different indicator face is employed showing a different degree of amplification of the entire assembly comprising the primary amplification of the expanding plug gage assembly which may be changed according to the present invention and the secondary amplification of the mechanism which remains constant. In FIGS. 2 to 4 the expanding plug gage assemblies are respectively indicated generally at 18, 20 and 22 and each comprises the same plug member 24 but coupled to a different plunger each of which will be described in detail. Expansion of the plug 24 is accomplished by a tapered plunger 26 contacting opposed seats formed on the interior of the plug 24 at the intersection of a pair of opposed semi-cylindrical openings 28 with semi-conical surfaces 30 located near the bottom of a deep bore 32 in which the plunger 26 is slidably mounted in a manner not shown but essentially like that of the Darlington patent. The gaging member 24 is longitudinally slit for part of its length at 34 to form two limbs 36 each extending from an integral hinge 38 formed by a reduced wall thickness and terminating in a set of measuring surfaces including a measuring diameter 40 and a planar end surface 42. The distance from the hinge to the end surface 42 is 2.150 inches and the end surface is separated by a distance of 0.150 inch from the seat at the intersection of the semi-conical surfaces 30 and the semi-cylindrical surfaces 28. These proportions which may be varied for plugs of different sizes are a factor in calculating the included angle of the tapered portion of the plunger as will later be seen. Calibration of the assembly 10 when coupled to the mechanism 12 is accomplished by means of a master ring 44 which is also employed for calibrating the assemblies 18, 20 and 22 when coupled to their individual mechanisms 12.

For purposes of illustration, it may be assumed that each of the assemblies 10, 18 and 22 is employed for measuring a bore having a basic size of 1.000 inch in a workpiece but that the workpieces are different and the bores in the different workpieces bear different tolerances. However, if the ring 44 is of appropriate accuracy, it may be employed for calibrating the expanding plug gage assemblies 10, 18, 20 and 22 as well as an assembly 46 which is coupled to an electronic comparator 50 including a pickup 52 to accomplish the coupling.

For positioning the gaging member when the assembly 10 is coupled to the mechanism 12, the assembly 10 includes a locating collar 54 and a retainer ring 56 surrounds the limbs 36 to prevent them from being excessively spread apart and thereby damaging the hinges 38.

In FIG. 2 there is shown a combination of the expanding plug gage assembly 18 and an amplifying and indicating mechanism 12 which is exactly the same as the mechanism shown in FIG. 1 except that it is provided with a dial indicator face 58 calibrated for a tolerance band of plus or minus 0.012 inch. The combination of FIG. 2 includes a plunger 60 having a much greater included angle in its tapered portion than the plunger 26 and thereby providing the least amplification of the plungers depicted in FIGS. 1 to 4 inclusive.

Shown in FIG. 3 is a combination including a mechanism 12 fitted with an indicator face 62 and the expanding plug gage assembly 20 including a plunger 64 formed with a tapered end having an included angle between that of the plunger 26 and the plunger 60 to provide an intermediate primary amplification factor.

Shown in FIG. 4 is a combination of the expanding plug gage assembly 22 and the mechanism 12 fitted with an indicator face 66 calibrated for the greatest amplification and smallest range of those shown in FIGS. 1 to 4 inclusive. There is included in the assembly 22, a plunger 68 having the smallest included angle which, as will be seen, provides the greatest degree of primary amplification.

The combination of the expanding plug gage assembly 46 shown in FIG. 5 with the electronic amplifier and indicator 50 is adapted to a greater amplification than the combinations illustrated in FIGS. 1 to 4 inclusive. However, the amplification in the combination of FIG. 5 is provided entirely by the electronic amplifier since the taper on a plunger 70 provides no primary amplification but merely causes the plug 24 to expand and translates the expansion on a one to one basis in coupling it to the pickup 52. The expanding plug gage assembly is mounted for use in a hollow handle 72 being located with respect to the handle by the collar 54. The pickup 52 is longitudinally adjusted and locked within the handle to calibrate the measurements of the assembly 46 when it is inserted into the master ring 44. For this purpose, the pickup 52 is mounted in a hollow shell 74 formed with a chuck for gripping a reduced diameter 76 on the pickup. The chuck is integral with the end of the shell 74 which is slotted at 80 and formed with a tapered nose 82 theaded at 84 to receive an internally tapered and threaded thimble 86 which compresses the chuck around the reduced diameter 76. The rearward end of the shell 74 is threaded at 88 to engage internal threads 90 in the handle 72 for adjusting the longitudinal position of the pickup 52 in the handle. Once the pickup 52 has been located in the handle as determined by the reading on the comparator 50 a lock nut 92 is tightened to lock the shell against rotation in the handle. In order to supply a spreading force to the plunger 70, a spring 94 is compressed between the thimble 86 and the inner end of the plunger 70 which is formed with a reduced guide diameter for the spring. The assembly 56 is received in the handle 72 which is formed as a chuck to grip a pilot diameter 98 on the plug gaging member 24 as seen in FIG. 5 but not shown in FIGS. 1 to 4 inclusive. The chuck end on the handle 72 includes a plurality of slots one of which is shown at 100 to permit the end of the hollow handle to be collapsed on the pilot diameter 98. The handle 72 is also formed with a reduced end portion which is tapered at 102 and threaded at 104 to fit complementary surfaces of a thimble 106.

The plungers 26, 60, 64 and 68 forming respective component parts of the expanding plug gage assemblies 10, 18, 20 and 22 are formed with a cross head end not shown but described in detail in the Darlington patent. The purpose of the cross head is that of coupling the plunger to an operating lever forming part of the amplifying and indicating mechanism 12. The coupling end of the plunger 70, however, is flat to be contacted by a spindle 108 on the pickup 52.

The manner of calculating the included angle of the tapers on the various plungers will now be described and values for all the primary amplification factors given. The size of the included angle is given by the following partly empirical formula which includes a correction for the fact that the seat in the plug is spaced along the plug axis from the planer end surface of the plug:

$$\tan \frac{A}{2} = \frac{G \times J}{.168H}$$

in which:

$G$ = the distance from hinge to seat
$H$ = the distance from hinge to planar end
$J$ = the total range on the indicator dial face
and in which 0.168 is 2 × 0.084, the 0.084 being the amount of longitudinal plunger movement corresponding to the full range on the indicator dial face.

Calculated by the above formula, the values of the included angles for the plungers are as follows:

| Part No. | Indicator Range | Included angle |
|---|---|---|
| 68 | ± .003 | 3° 48' |
| 26 | ± .006 | 7° 36' |
| 64 | ± .009 | 11° 23' |
| 60 | ± .012 | 15° 8' |
| 70 | N.A. | 49° 53' |

Having thus disclosed my invention, what I claim as new and desire to secure by Letters Patent of the United States is:

1. An expanding plug gage assembly adapted to be coupled to an amplifying and indicating mechanism, comprising an elongated plug body longitudinally slotted along part of its length to form a pair of spring limbs extending from an integral hinge to an expandable measuring end portion including a pair of generally semi-cylindrical measuring surfaces and a planar end surface, a first plunger having a tapered end formed to an included angle adapted to provide a pre-determined degree of primary amplification, and a pair of opposed seats in the plug body near the end surface, defined by the intersection of semi-cylindrical interior surfaces and conical relief surfaces along a line of contact with the tapered end of the plunger, the included angle of the conical relief surfaces being greater than that of the tapered end, whereby contact between the plunger and the seats remains at the intersection throughout the operating range of the assembly.

2. An expanding plug gage assembly according to claim 1 further comprising a second plunger having a tapered end formed to an included angle different from that of the first plunger, the first and second plungers being both selectively engageable with the seats in the plug body to provide two pre-determined degrees of primary amplification.

3. An expanding plug gage assembly according to claim 1 further including an indicating mechanism having a dial face graduated to agree with the degree of primary amplification provided by the tapered end of the plunger.

4. Gaging apparatus adapted to measure different tolerance bands about a common dimension, comprising a single elongated hollow plug body longitudinally slotted along part of its length to form a pair of spring limbs extending from an integral hinge to an expandable measuring end portion including a pair of generally semi-cylindrical measuring surfaces and a planar end surface, a pair of opposed seats in the plug body near the end surface, the seats being defined by the intersection in a transverse plane of semi-cylindrical interior surfaces and conical relief surfaces, a plurality of plungers each having a tapered end formed to an included angle adapted to provide a pre-determined degree of primary amplification when inserted into the plug body and into engagement with the seats and an amplifying and indicating mechanism related to each plunger, each mechanism having a dial face calibrated in accordance with the primary amplification of the related plunger.

* * * * *